Feb. 15, 1966  R. G. LINCOLN ETAL  3,235,543
METHOD FOR PRODUCING A FLOWERING HORMONE
Filed Feb. 21, 1961
Fig. 1
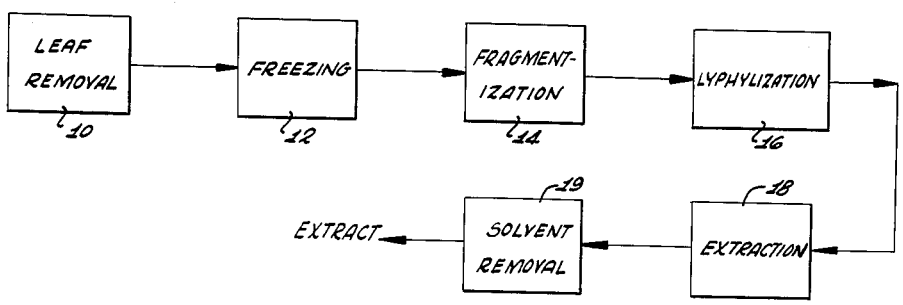
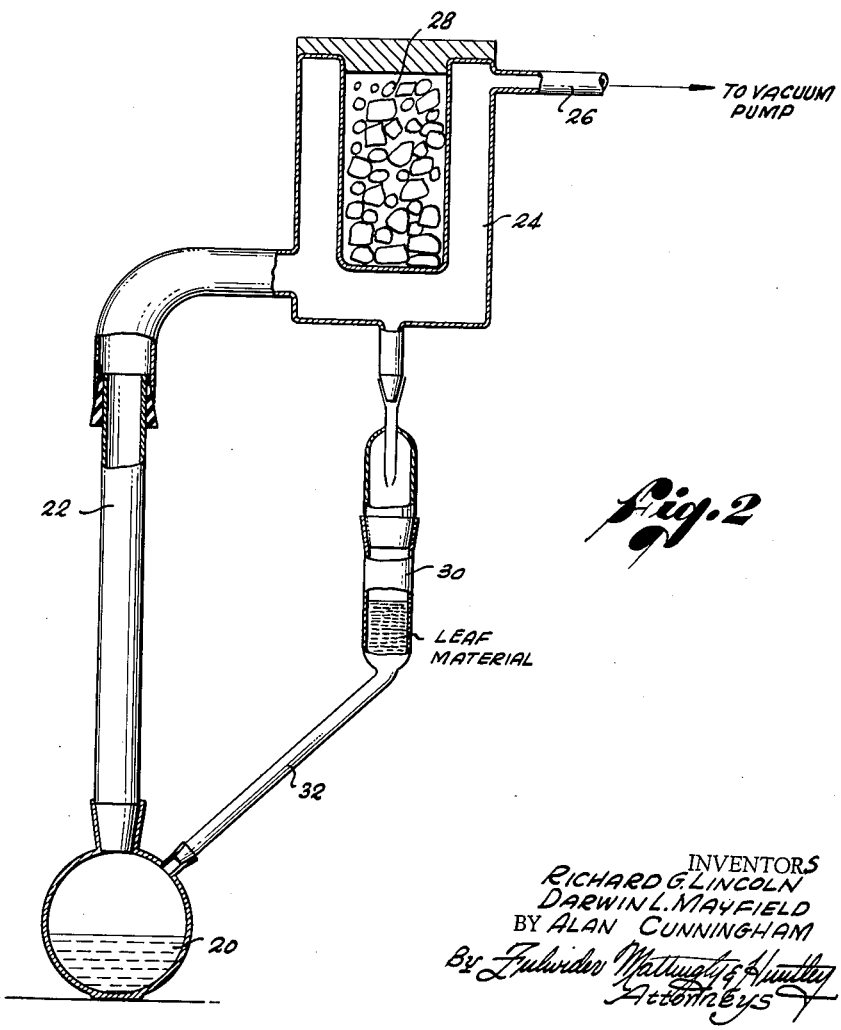
Fig. 2
INVENTORS
RICHARD G. LINCOLN
DARWIN L. MAYFIELD
BY ALAN CUNNINGHAM
By Fulwider Mattingly & Huntley
Attorneys United States Patent Office 3,235,543
Patented Feb. 15, 1966

3,235,543
METHOD FOR PRODUCING A FLOWERING HORMONE
Richard G. Lincoln, 6820 Kallin Way, Long Beach 15, Calif.; Darwin L. Mayfield, 3333 Roxanne Ave., Long Beach 8, Calif.; and Alan Cunningham, Stanford Village, Stanford, Calif.
Filed Feb. 21, 1961, Ser. No. 90,785
4 Claims. (Cl. 260—236.5)

This invention relates to the production of a chemical entity which will cause plants to flower regardless of their normal flowering season and relates particularly to the isolation of a chemical mixture containing a plant hormone which, when applied to non-flowering plants, causes them to flower.

Workers in the field have long thought that a chemical entity is responsible for flowering. Evidence is further available which supports the thesis that this chemical entity is biologically produced at one site in the plant and is translocated to a second site to there initiate the flowering response. This chemical entity can be thought of as a plant hormone which initiates or controls the flowering process and is sometimes referred to as a flowering hormone hereafter.

Attempts have been made, for many years, by botanists and other experts in the field, to find a chemical floral initiating preparation or flowering hormone. Numerous chemicals have been tested for such activity. Occasionally, some evidence of floral initiating activity has been found in certain plant extract preparations; however, workers in the field have been unable to obtain any degree of consistency in their results. Hence, the search has continued for a true floral initiating preparation, i.e. one which contains the chemical entity responsible for the initiation of flowering in plant life.

There is one apparent exception to the foregoing. Gibberellic acid has the property of stimulating floral development in many long day photoperiodically sensitive plants. (A long day photoperiodically sensitive plant is one which will flower best in either continuous light or in relatively long periods of light in conjunction with short periods of dark. Thus, as the dark periods lengthen past a critical point, this type of plant will not flower.) Gibberellic acid is a plant growth accelerator. It speeds up the growth of the plant and induces flowering in long day plants. This acid has, according to the best evidence available, the ability to stimulate the production of the chemical entity which is directly responsible for the initiation of flowering. That is to say, gibberellic acid has an indirect effect on flowering but is not the direct casual agent for this phenomenon.

In summary then, gibberellic acid has not provided an answer to the search for a primary floral initiating stimulus.

Bearing in mind the foregoing facts, it is a major object of the present invention to isolate a plant extract which contains a floral initiating chemical compound, entity or flowering hormone for application to any plant.

It is another major object of the present invention to provide a process for the preparation of a floral initiating chemical compound or entity from a plant.

A further object of the present invention is to provide a process whereby a plant extract is prepared comprising a primary floral initiating compound or entity, the plant extract being storable over long periods of time without significant deterioration in floral initiating activity.

It is now well known that many plants will flower, or will not flower, depending upon the day-length (or daylight) conditions to which they are exposed. Of course, this is but another way of saying that many plants flower seasonally. The phenomenon by which the period of daylight "triggers" or inhibits a flowering response is known as photoperiodism. In so-called long day plants (as mentioned previously), darkness inhibits flowering. Thus, long day plants will flower best in continuous light. As dark periods lengthen past a critical point, the plant will not flower. In short day plants, darkness promotes flowering; thus continuous light would prevent flowering of this type completely.

There is a third category of plant, the day neutral plant, which will flower regardless of light conditions.

Therefore, still another object of the present invention is to provide a plant extract which, when applied to the plant, causes flowering of short day plants even when exposed to continuous light, causes flowering of long day plants even when exposed to continuous dark conditions, and causes flowering of day neutral plants prior to their normal response time for flowering.

In short, we wish to achieve, and we have achieved, flowering of non-flowering plants, either in environments in which the plants would never flower, or in environments where the normal plant response would be a non-flowering response.

These, and other objects, of the present invention will become clearly understood with reference to the following description, and to the accompanying drawings in which:

FIGURE 1 is a purely diagramamtic representation of the process steps of our invention; and FIGURE 2 is a schematic showing of an extraction apparatus utilizable in the process.

In general, our invention has made it possible to isolate—what we believe to be for the first time—a plant extract containing the chemical entity, or flowering hormone, which initiates flowering in plant life, i.e., in practically speaking, many different plants. This plant extract can be utilized with an astonishingly high degree of success, consistency and reproducibility. Further, the plant extract need not be utilized immediately after isolation; on the contrary, it may be stored for a long period of time without apparent deterioration in activity.

We have concluded that the flowering hormone is being biologically produced in the leaf of flowering plants, and is translocated to a second site, the bud, to initiate the flowering response. We therefore remove the leaves from a flowering branch and endeavor to prevent any chemical reaction within the leaf, i.e., by the chemical entity or flowering hormone before its reaction with other substances, and before its breakdown. To accomplish this, the process steps are, in the main, conducted at relatively low temperature. The process steps are generally outlined below.

Th leaves of any desired plant having flowers or flower parts are removed and quick frozen, e.g., by means of immersion in a low temperature medium, such as liquid nitrogen. The leaf material, while thus frozen, is fragmented and its moisture content reduced, as by lyophilization, to prevent any appreciable reaction of the hormone entity in a water phase.

The flowering hormone in the lyophilized leaf material is then extracted with a suitable solvent at a temperature preferably below 0° C. The maitnainence of low temperature conditions during extraction is not essential so long as the extraction is conducted in the absence of oxygen (under partial vacuum). Thus, a temperature of as high as 50° C. may be employed without deleterious effect on the production of the flowering hormone. The solvent is then removed by evaporation from the solvent extract, and the residue remaining contains the flowering hormone.

The hormone is then preferably admixed with lanolin, or other viscous material, and applied to the leaf surface of a non-flowering plant. A flowering response occurs in several days even under light conditions where flowering would not ordinarily occur.

Referring now to the process in detail, and to FIGURE 1, our process first requires removal of leaves from flowering brances of a plant. This step is indicated, in the box diagram, by numeral 10. The fresh leaves are then quick frozen, as indicated by the numeral 12. It is believed that rapid freezing is required so as to prevent, or inhibit, any breakdown or reactivity of the flowering hormone entity in the leaves. To this end, the leaves are immersed in a low-temperature bath, e.g. liquid nitrogen maintained at about −196° C. However, immersion of the leaves in any low-temperature media in such manner that freezing will be rapid will accomplish the desired chemical inactivity. (Freezing of the leaf occurs between −3 and −8° C., the temperature range at which ice forms in the leaf.)

The leaves, while frozen, are readily broken into fine fragments by conventional means, such as by mechanical compression, e.g. with a wooden mallet.

This fragmentation, while not essential, is preferred so that the later steps of lyophilization and extraction may proceed more rapidly and efficiently. The fragmentization is indicated in zone 14.

The fragmented frozen leaf material has substantial amounts of water, as much as 70% by weight, included therein. Of course, since the leaf material is frozen, the water is present as ice. In this form, normal solution reactions cannot occur and interreaction of substances in solution with the flowering hormone is believed to be prevented or substantially inhibited. The ice is evaporated, from the frozen leaf material, in vacuo, at a temperature below 0° C., the water passing indirectly into the gaseous phase, i.e., the ice sublimes from the leaf material. Such a process is known as lyophilization and is conventional in the pharmaceutical and other fields. A vacuum pressure of 10 mm. of mercury is a typical operating pressure within the vacuum chamber of the lyophilizer.

The sublimation of the ice from the leaf material maintains the leaf material at a temperature below about 0° C. because of the inherent cooling effect of the subliming ice. Also, since the water never becomes a liquid, reactivity of solutes with the flowering hormone entity in the leaf material is minimized, if not absolutely prevented.

The amount of water to be removed from the frozen leaf material depends primarily upon the length of time of storage of the hormone after its extraction. If the hormone extract is to be employed immediately, or within several hours after production, the amount of water that may be retained without deleterious effect is below about 20%. However, if storage of the hormone extract is desired for several months or more, the moisture content of the leaf material, after lyophilization, is preferably kept below 2%.

The lyophilized fragmentized leaf material is then extracted, with an organic solvent at a temperature preferably, but not necessarily, maintained about or below 0° C. Organic polar solvents are preferred. Examples are alcohols, ketones, ethers, and chlorinated hydrocarbons, that will boil, under partial vacuum conditions, near or below 0° C. Thus, 1–6 carbon alcohols and 3–9 carbon ketones may be readily employed, as well as others having 2–8 carbon atoms, chlorinated hydrocarbons having 1–6 carbon atoms, esters having from 3–9 carbon atoms as well as dimethylformamide. As a specific example, if absolute methanol is employed as the solvent, a partial vacuum of between 10 and 20 mm. of mercury is maintained in the extraction vessel sufficient to maintain the temperature of the methanol at boiling between −5 and −10° C. The extraction is efficiently accomplished, by the modified Sohxlet apparatus, shown in FIGURE 2—it being understood that this apparatus is shown by way of example, and not by way of limitation.

The solvent, e.g. methanol, is placed in the retort or flask 20; the leaf material is placed in chamber 30.

The retort 20 is placed under a vacuum sufficient to cause the solvent therein to boil at below 0° C., the solvent vapors passing up through overhead 22 to a condenser 24. The condenser has a vacuum pump (not shown) connected thereto at 26.

The condenser is maintained at well below the boiling temperature of the flask by means of Dry Ice-acetone slurry 28 in the well of condenser 24.

The solvent vapors condense in the condenser 24, fall by gravity into chamber 30, and contact the leaf material. The solvent, now containing substances including the flowering hormone returns via return leg 32 to retort 20. The solvent extract is initially extremely dark in color.

Evaporation of the solvent from the retort 20 is continued, leaving the extracted material in the retort 20, and the condensed vapors continue to contact the leaf material in chamber 30 and return to retort 20. This process is maintained until the solvent leaving chamber 30 is colorless, at which time the extraction is believed to be essentially complete.

The extract remaining in retort 20 is subjected to reduced pressure evaporation, thus removing all solvent at room temperature or below as indicated by the box 19 of FIGURE 1.

The residue remaining, a dark tarry residue, may, in some instances, be employed as a direct smear on the leaf surface of non-flowering plants. However, at present, because the residue is not a concentrated flowering hormone material and because there is some evidence that the flowering hormone material is adversely affected by oxygen, it is admixed with an inert highly viscous substance that acts as a physical barrier preventing oxidation. At the same time, the viscous material is a convenient medium enabling diffusion contact to occur between the hormone-containing extract and the leaf tissue. Examples of materials that may be employed as the carrying and oxygen-shielding medium are lanolin, petroleum jelly, neutral silica gel, and agar.

A specific example of our invention is set forth below:

Flowering branch tips were harvested from indigenous *Xanthium strumarium L.* var. *canadense* (Mill.) T. and G.[1] of the Long Beach area. The plants were picked when the staminate terminal influorescence was from one-half to one centimeter in diameter. Each branch carried three to five mature leaves. A quantity of fresh material was frozen in liquid nitrogen and broken into fine fragments while in the frozen state. Care was taken that the material remained frozen until it had been dried in a vacuum lyophilizer to a moisture content of below 1% by weight. The lyophilizer was kept at a temperature below 0° C. Following lyophilization, the material was placed in sealed containers and stored in a deep freeze at −20° C.

100 grams of lyophilized material was then extracted with 1000 cc. of absolute methanol under a partial vacuum sufficient to maintain the temperature of boiling methanol between −5 and −10° C. The modified Sohxlet apparatus shown in FIGURE 2 was used, the condenser containing a Dry Ice-acetone slurry as a coolant. The methanol solvent was removed from the extract by evaporation at room temperature or below in a Rinco apparatus attached to a water aspirator system.

The product was a dark green, tarry residue which was mixed to homogeneity with anhydrous (U.S.P.) lanolin.

Two grams of the residue, homogeneously mixed with 17 grams of lanolin, was applied to the underside of the ---
[1] C. L. Hitchcock, A. Cronquist, M. Ownbey, J. W. Thompson, Vascular Plants of the Pacific Northwest (University of Washington Press, Seattle, 1955), part 5.

leaf surface of ten test plants. Ten control plants were treated in like fashion with 17 grams of pure lanolin. During the fourteen days subsequent to the application of the lanolin preparations, all test plants and control plants were maintained on a precise 8-hour dark and 16-hour (500-foot candle intensity) light regime. On the fourteenth day following application, the terminal bud of each plant was dissected to ascertain the flowering response. The flowering stages were numerically evaluated in accordance with a numerical scale based on the diameter and morphological stage of development of the terminal staminate inflorescence. Vegetative plants were rated as zero on the scale. The first morphological change in the stem apex that could be clearly recognized as flowering was assigned a value of 1.0 (stage 1). A flowering apex measuring 0.25 mm. in diameter was evaluated as 2.0 (stage 2). An additional increment of 1.0 (e.g. to stage 3) was allowed for each 0.25 mm. increase in the diameter of the developing inflorescence. The results are presented in Table I.

*Table I.—Flowering response of xanthium following application of extract*

| Treatment | Flowering Response | Numerical Average of Flowering Response |
|---|---|---|
| Untreated control plants | All 10 plants vegetative | 0.0 |
| Extract treated plants | Five plants vegetative. One plant—stage one. Two plants—stage two. Two plants—stage three. | 1.1 |

Inasmuch as the flowering response is zero in the untreated plants, and 50% response in the treated plants, the results are very highly significant. They clearly demonstrate the reproducibility of floral initiation in a short day plant as the direct result of the topical application of our extract prepared from the tissues of flowering plants in accordance with the process of our invention. Changes and modifications in our process may be made that lie within the scope of our invention. Hence, we do not intend to be bound by the example and description set forth above, but only by the claims which follow.

We claim:

1. A process for the preparation of a floral initiating extract for plants which comprises the steps of: removing leaves from a flowering branch of *Xanthium strumarium L.* var. *canadense;* rapid freezing of said leaves, while fresh; fragmentizing said frozen leaf material; evaporating the water in said frozen leaf material to a moisture content of below about 20%; contacting said leaf material with a polar organic solvent; and evaporating said solvent, the residue remaining containing the floral initiating extract.

2. The process of claim 1 wherein said solvent boils under partial vacuum conditions of less than about 20 mm. Hg at about 0° C. and is selected from the group consisting of an alcohol having from 1 to 6 carbon atoms, a ketone having from 3 to 9 carbon atoms, an ether having from 2 to 8 carbon atoms, an ester having from 3 to 9 carbon atoms and dimethylformamide.

3. The process of claim 1 wherein said residue is admixed with lanolin.

4. A process for preparing a floral initiating extract which comprises the steps of: removing leaves from a flowering branch of *Xanthium strumarium L.* var. *canadense;* rapid freezing said leaves, while fresh; fragmentizing said frozen leaf material; lyophilizing the water in said frozen leaf material to a moisture content of below about 20%; extracting said leaf material with a polar organic solvent, said solvent being maintained at a temperature of below 50° C., and under vacuum; evaporating said solvent, the residue remaining containing the floral initiating extract; and admixing said extract with a viscous-carrying medium.

References Cited by the Examiner

UNITED STATES PATENTS

| 2,098,110 | 11/1937 | Schertz et al. | 260—236.5 |
| 2,605,554 | 8/1952 | Flosdorf | 34—1 |
| 2,802,306 | 8/1957 | Leopold | 47—58 |
| 2,937,206 | 5/1960 | Roberts. | |

OTHER REFERENCES

Mary et al.: Chem. Abstracts, vol. 48 (1954), page 14123i.

Overbeek et al.: Botanical Gazette, vol. 106, pages 440 to 451, June 1945.

"Weed Flora of Iowa" (Pammel et al.), published 1926 by the State of Iowa, at Des Moines, for the Iowa Geological Survey as their Bulletin No. 4, Revised edition, page 632 relied on.

WALTER A. MODANCE, *Primary Examiner.*

F. G. CRAVER, JULIEN S. LEVITT, NICHOLAS S. RIZZO, *Examiners.*